US011935160B2

(12) United States Patent
Soons et al.

(10) Patent No.: US 11,935,160 B2
(45) Date of Patent: Mar. 19, 2024

(54) METHOD OF GENERATING AN ENHANCED TOMOGRAPHIC IMAGE OF AN OBJECT

(71) Applicant: AGFA NV, Mortsel (BE)

(72) Inventors: Joris Soons, Mortsel (BE); Adriyana Danudibroto, Mortsel (BE)

(73) Assignee: Agfa NV, Mortsel (BE)

( * ) Notice: Subject to any disclaimer, the term of this patent is extended or adjusted under 35 U.S.C. 154(b) by 471 days.

(21) Appl. No.: 17/272,717

(22) PCT Filed: Aug. 29, 2019

(86) PCT No.: PCT/EP2019/073084
§ 371 (c)(1),
(2) Date: Mar. 2, 2021

(87) PCT Pub. No.: WO2020/048865
PCT Pub. Date: Mar. 12, 2020

(65) Prior Publication Data
US 2021/0375010 A1  Dec. 2, 2021

(30) Foreign Application Priority Data

Sep. 3, 2018  (EP) .................................. 18192258

(51) Int. Cl.
*G06T 11/00*  (2006.01)
(52) U.S. Cl.
CPC .......... *G06T 11/008* (2013.01); *G06T 3/4046* (2013.01); *G06T 2207/10072* (2013.01)
(58) Field of Classification Search
CPC ................. G06T 11/008; G06T 3/4046; G06T 2207/10072; G06T 2207/20084; G06T 11/006; G06T 2211/424; G06T 2207/10081; G06T 11/005; G06T 7/0012; G06T 11/003; G06T 2207/30004; G06T 2211/412; G06T 2211/421; G06T 2210/41; G06T 2207/10104; G06T 2207/20081; G06T 2211/432; G06T 2211/40; G06T 2211/441; G06T 2207/10116; G06T 19/20; G06T 2207/10088; G06T 2211/416;
(Continued)

(56) References Cited

U.S. PATENT DOCUMENTS

2015/0201895 A1* 7/2015 Suzuki ...................... G06T 5/50
382/131
2016/0171723 A1* 6/2016 Claus ................... A61B 6/5205
382/131
(Continued)

OTHER PUBLICATIONS

Beister, Marcel et al., Iterative reconstruction methods in X-ray CT, Physica Medica (2012) 28, pp. 94-108.
(Continued)

*Primary Examiner* — Nimesh Patel
(74) *Attorney, Agent, or Firm* — Leydig, Voit & Mayer, Ltd.

(57) ABSTRACT

Tomographic images acquired by iterative reconstruction of low quality projection images, are enhanced by the steps of correcting at an iteration step the result of the previous iteration step by means of a back-projection of the result of a comparison of a projection image and the forward projection of the result of the previous iteration step whereby this result is enhanced by subjecting it to a trained neural network.

17 Claims, 4 Drawing Sheets

(58) Field of Classification Search
CPC ..... G06T 5/50; G06T 2211/428; G06T 5/001; G06T 15/205; G06T 9/002; G06T 2200/04; G06T 2207/30061; G06T 2207/30101; G06T 2207/30052; G06T 7/20; G06T 15/00; G06T 5/006; G06T 7/11; G06T 7/13; A61B 6/032; A61B 6/5258; A61B 6/5205; A61B 6/488; A61B 6/563; A61B 6/469; A61B 8/483; A61B 5/055; A61B 6/03; A61B 6/5235; A61B 5/0536; A61B 6/5229; A61B 6/5241; A61B 6/527; G06N 3/08; G06N 3/045; G06N 20/00; G06N 3/044; G06N 3/084; G01T 1/2985; G01T 1/1648; G01T 1/249; G01T 1/1647; G01T 1/1603; G01T 1/006; G01N 2223/419; G01N 23/046; G01N 2291/106; G01N 29/0654; G01N 29/2418; G01N 2223/612; G01N 29/30; G01N 2223/401; G01N 23/044; G01N 23/04; Y10S 378/901; G01R 33/481; G01R 33/56; G01J 1/0266; G01J 1/0411; G01J 1/0414; G01J 1/0425; G01J 1/4228; G01J 1/4257

See application file for complete search history.

(56) References Cited

U.S. PATENT DOCUMENTS

| | | | |
|---|---|---|---|
| 2018/0182133 A1* | 6/2018 | Tanaka | G06T 7/0012 |
| 2018/0229056 A1* | 8/2018 | Paysan | A61N 5/1081 |
| 2019/0325621 A1* | 10/2019 | Wang | G06N 3/045 |
| 2020/0034999 A1* | 1/2020 | Van Heteren | A61N 5/1067 |
| 2020/0357148 A1* | 11/2020 | Soons | G06T 7/0012 |

OTHER PUBLICATIONS

Goodfellow, Ian J. et al., Generative Adversarial Nets, Jan. 1, 2014, Retrieved from Internet at URL:https://arxiv.org/pdf/1406.2661.pdf, 9 pages.

Johnson, Justin et al., Perceptual Losses for Real-Time Style Transfer and Super-Resolution, Arxiv.org, Cornell University Library, 201 Olin Library Cornell University, Ithaca, NY, Mar. 27, 2016, 18 pages.

Wu, Dufan et al., Iterative Low-dose CT Reconstruction with Priors Trained by Artificial Neural Network, IEEE Trans Med Imaging, Dec. 2017, 36(12), 29 pages.

International Search Report relating to PCT/EP2019/073084 dated Oct. 30, 2019, 3 pages.

Written Opinion relating to PCT/EP2019/073084 dated Oct. 30, 2019, 7 pages.

* cited by examiner

METHOD OF GENERATING AN ENHANCED TOMOGRAPHIC IMAGE OF AN OBJECT

REFERENCE TO RELATED APPLICATIONS

This application is a 371 National Stage Application of PCT/EP2019/073084, filed Aug. 29, 2019, which claims the benefit of European Application No. 18192258.4, filed Sep. 3, 2018, the contents of which are incorporated by reference herein in their entirety.

FIELD OF THE INVENTION

The present invention is in the field of digital radiography and more in particular relates to a method to enhance image quality and reduce artefacts, more particularly in computed tomography (CT), cone beam computed tomography (CBCT) or tomosynthesis imaging systems.

BACKGROUND OF THE INVENTION

In Computed Tomography (CT) an X-ray source and a linear detector rotate around a patient or an object to acquire a sinogram being the 2-D array of data containing projections, as is shown in FIG. 1. This sinogram is then used in a reconstruction step (e.g. applying the Filtered Back Projection method, known in the art) to obtain images representing virtual slices through a patient or through an object.

Cone beam Computed Tomography (CBCT) is another imaging technique in which a cone shaped beam of penetrating radiation (x-rays) is directed towards an object or a patient.

A two-dimensional radiation detector such as a flat panel detector is used to detect the x-rays that are modulated by the object or patient.

The x-ray source and the detector rotate relative to the patient or object to be imaged.

A cone-shaped beam is directed through an area of interest on the patient or the object onto an area on the detector on the opposite side of the x-ray source.

During the rotation multiple sequential planar images of the field of view are acquired in a complete or sometimes partial arc.

Acquired images are called projection images (Illustrated in FIG. 2). These acquired images are similar to regular low dose x-ray images.

A 3D image is reconstructed by means of the projection images recorded at the different angles by applying a reconstruction algorithm (e.g. Feldkamp-Davis-Kress reconstruction).

Another application which uses a flat panel detector is tomosynthesis. In this method the x-ray source also rotates around the object or patient but the rotation angle is limited (e.g. rotation of 30 degrees).

Last decade, much research has been focused on advanced iterative reconstruction schemes which take prior knowledge into account. Iterative reconstruction algorithms have shown to reduce the dose up to 70% for some high contrast imaging tasks.

A classic iterative reconstruction approach solves the equation:

$$\underset{x}{\operatorname{Argmin}} \frac{1}{2} \|Ax - y\|_W^2 + \beta R(x) \quad (\text{eq1})$$

in which x is the volume to be reconstructed, y the projection images or sinograms, A the forward projection, W defining the $L^W$-norm used, and R(x) a regularizer function which gives a certain penalty (e.g. penalty for non-smoothness) with a parameter $\beta$.

Usually, in this approach the first term, or the data term, is a fitting model of the observed projection data, while the second term, or the regularization term, often incorporates prior knowledge such as noise-characteristics, assumptions on sparsity, etc. The first term is minimized if the reconstructed volume x is consistent with the projection image y. The second term enforces a certain condition on the reconstructed volume: e.g. a total variation (TV) minimization as R(x) will give an edge preserving non-smoothness penalty, enforcing a piecewise constant condition.

Choosing a certain condition can have a profound impact on the solution and tuning the parameter $\beta$ could be cumbersome. Moreover, the iterative reconstruction stops after a predefined amount of iteration steps or when a stopping criteria is met. In a practical algebraic reconstruction implementation, the iterative reconstruction (e.g. Simultaneous iterative reconstruction technique) is alternated with TVmin iterations. However, regularizers are often cumbersome to tune. Mistuning could lead to no effect of regularization or, even more severely, to the deletion of real image content such as structures.

Nowadays, flat panel detectors used in the above described imaging techniques are capable of acquiring high resolution images, with pixel sizes of 150 μm or smaller. However, the read-out speed of panels is proportional to the resolution of the images. Therefore, in applications that demand a high acquisition speed, a tradeoff has to be made between pixel resolution and readout speed.

This is conventionally performed by binning pixels (e.g. in a 2×2 binned mode, a 4 times higher frame rate can be achieved at the cost of a pixel size that is doubled).

Also in CBCT a trade-off has to be made between acquisition speed and resolution.

A higher acquisition speed results in a shorter total scan time, which reduces the risk of motion by the object or patient being imaged, but only at the expense of the resolution of the acquired 2D images.

To compensate for the loss of resolution, the acquired images can be up-sampled.

One way to perform this up-sampling is to apply a linear method, i.e. interpolation, to the image. However, interpolation methods such as nearest-neighbor, bilinear or bicubic often result in artifacts such as stair-casing, blur and ringing.

In some cases, it is possible to use non-linear methods to restore true resolution content beyond the band limit of the imaging system. This is called super-resolution. However, the forward or direct problem (downsampling) is well-posed, while the inverse problem (upsampling, overcoming the fundamental resolution limits) is in general ill-posed.

In order to overcome this instability, regularization methods are needed to get a good solution. These regularization methods use prior information or signal redundancy to compensate the loss of information.

For medical imaging we could leverage prior knowledge about the anatomy or imaging setup to improve image quality of the super resolution image. However, unlike photographic imaging, the goal of medical imaging is to facilitate diagnosis, rather than to produce visually pleasing images. Consequently, image processing artifacts are much less tolerable in medical images than in photographic applications which limit their breakthrough today.

For super-resolution, we need to estimate the missing high frequency content (edges) beyond the Nyquist frequency.

Different algorithms exist to obtain super-resolution.

In edge-directed algorithms (e.g. NEDI, DDCI) the aim is to preserve the edge by using statistical information. Another way is to restore images by using information from multiple frames. As a result, redundant information is captured and by sub-pixel image alignment and fusion, a higher spatial or temporal resolution restoration can be achieved. Tools such as ML, MAP and POCS can be applied. Such techniques are used for video processing and could easily be adapted to dynamic imaging of patients with X-rays.

Another class of algorithms are example-based methods. They exploit the internal similarities of images of the same kind of image or learn the mapping function from low to high resolution based on existing example pair.

The advent of the use of deep network such as a Convolutional Neural Network (CNN) for Super resolution (SR) was started by the work of Dong, Chao et al. "Learning a deep convolutional network for image super-resolution"—European Conference on Computer Vision. Springer, Cham, 2014 which eventually became a benchmark for other SR with deep learning.

The use of deep learning networks has shown superior performance in comparison to up-sampling by interpolation or other non-deep learning-based methods in terms of visual quality or signal to noise ratio measurement. CNN is a method that maps output to input through a series of filtering layers. Layers could be convolutional, pooling or fully connected layers, combined with a non-linear activation function such as RELU (rectified linear unit). A deeper network, and thus deep learning, are achieved by adding more layers.

CNN also have shown the potential to perform super-resolution in video sequences. In videos, most of a scene information is shared by neighboring video frames. The similarity between frames provides the data redundancy that can be exploited to obtain super-resolution In contrast, the scene is not shared by neighboring projections in computed tomography. Nevertheless, data redundancy can be obtained by getting information from shapes that are viewed from a range of known directions. In combination with the 3D reconstruction, this approach may steer the solution to higher resolution.

It is an object of the present invention to provide a method for generating high quality tomographic images of an object or a patient, part of a patient or animal, by applying a combination of reconstruction and a trained neural network.

SUMMARY OF THE INVENTION

The present invention provides a method according to claim 1.

Specific features for preferred embodiments of the invention are set out in the dependent claims.

According to the present invention a tomographic image of an object or a patient is obtained starting from low quality projection image data and using an iterative reconstruction in combination with a neural network to enhance that quality aspect. The neural network is trained with a first set of high quality tomographic image data and a second set of low quality tomographic image data.

In the context of the present invention image quality comprises noise content, resolution, presence of artefacts etc. Image quality can be affected by the use of low dose at image irradiation, the use of monochromatic/polychromatic irradiation, scattering, the presence of an unwanted (disturbing) object in the image etc.

Examples will be described in detail further on.

High quality refers to the quality of a certain aspect in an image that a user expects to obtain after processing.

Low quality refers to the quality of a certain aspect that the user can obtain when acquiring the image.

For example when the aspect is resolution, a high quality image will have a higher resolution than the resolution that can be obtained by the image acquisition system that is used. A well trained CNN can learn prior information or retrieve redundant information on images, allowing us to obtain high frequency information beyond the Nyquist frequency.

Further advantages and embodiments of the present invention will become apparent from the following description and drawings.

DETAILED DESCRIPTION OF THE INVENTION

Figure 1:
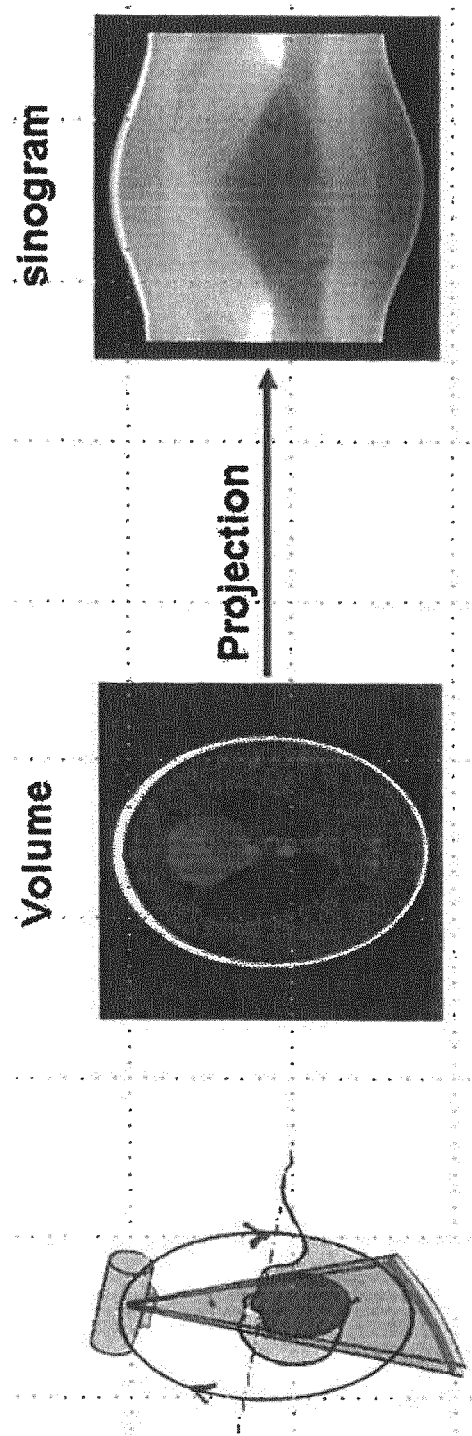
FIG. 1 illustrates CBCT image acquisition.

FIG. 1 illustrates a cone beam image acquisition system for generating a set of 2D images that are used in a reconstruction algorithm to generate a 3D image representation of an object.

An x-rays source directs a cone of radiation towards an object (e.g. a patient). A series of two dimensional images is generated by emitting a cone of radiation at different angles. For example 400 images are generated over a range of 360 degrees.

The radiation transmitted through the object is detected by means of a 2 dimensional direct radiography detector that moves along with the cone beam (the invention is explained with regard to cone beam tomography but is likewise applicable to CT and tomosynthesis).

An iterative reconstruction algorithm running on a computer, such as a Simultaneous iterative reconstruction technique (SIRT) is used to generate a 3D image representation of the object. Such reconstruction algorithms are well-known in the art. Iterative reconstruction steps are alternated with regularization steps. The regularization step is a trained neural network to improve image quality of the tomographic image.

The reconstructed image can then be stored in a memory or can be connected to a display device for display and examination or can be sent to a printer to generate a hard copy image or to a digital signal processor to be subjected to further processing etc.

Methodology

Supervised Learning of the Neural Network

Figure 2:
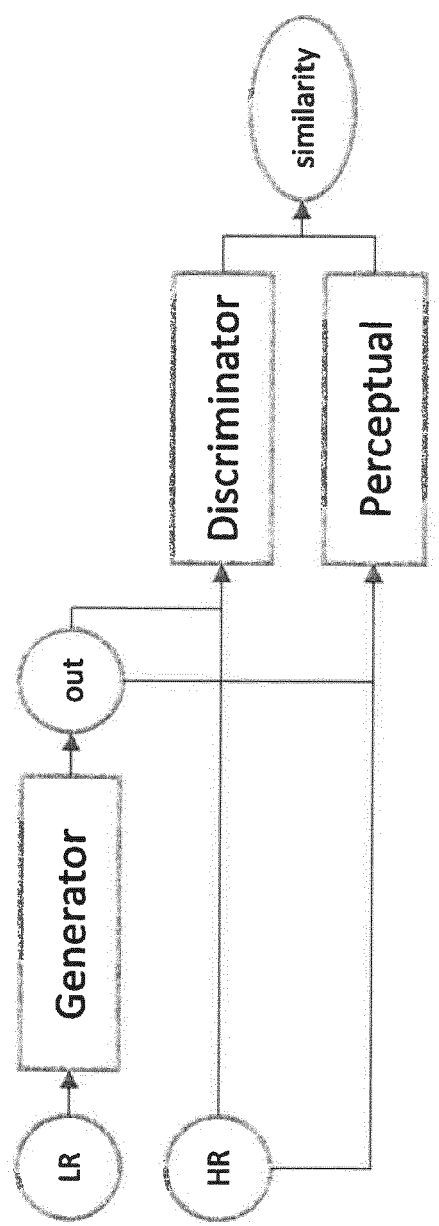
FIG. 2 shows the outline of the network used in training.

FIG. 2 illustrates the training of a neural network (CNN) in accordance with the present invention.

A typical CNN has a training and inference stage.

During training, the network learns to enhance the low quality image from a set of examples consisting of the high quality and the corresponding low quality images or image patches. The CNN learns by adjusting the weights of the convolution kernel with the aim to optimize the performance metric.

During inference (and testing), low quality images are transformed using the trained network. Several techniques exists to obtain faster and better learning: residual learning, the use of various performance metrics (MSE, SSIM, perceptual), batch normalizing, data augmentation, . . . .

Calculation time can be improved by using multithreading. In this case by using Python and Theano legacy library for deep learning and running the training on GTX Titan X card.

Figure 3:
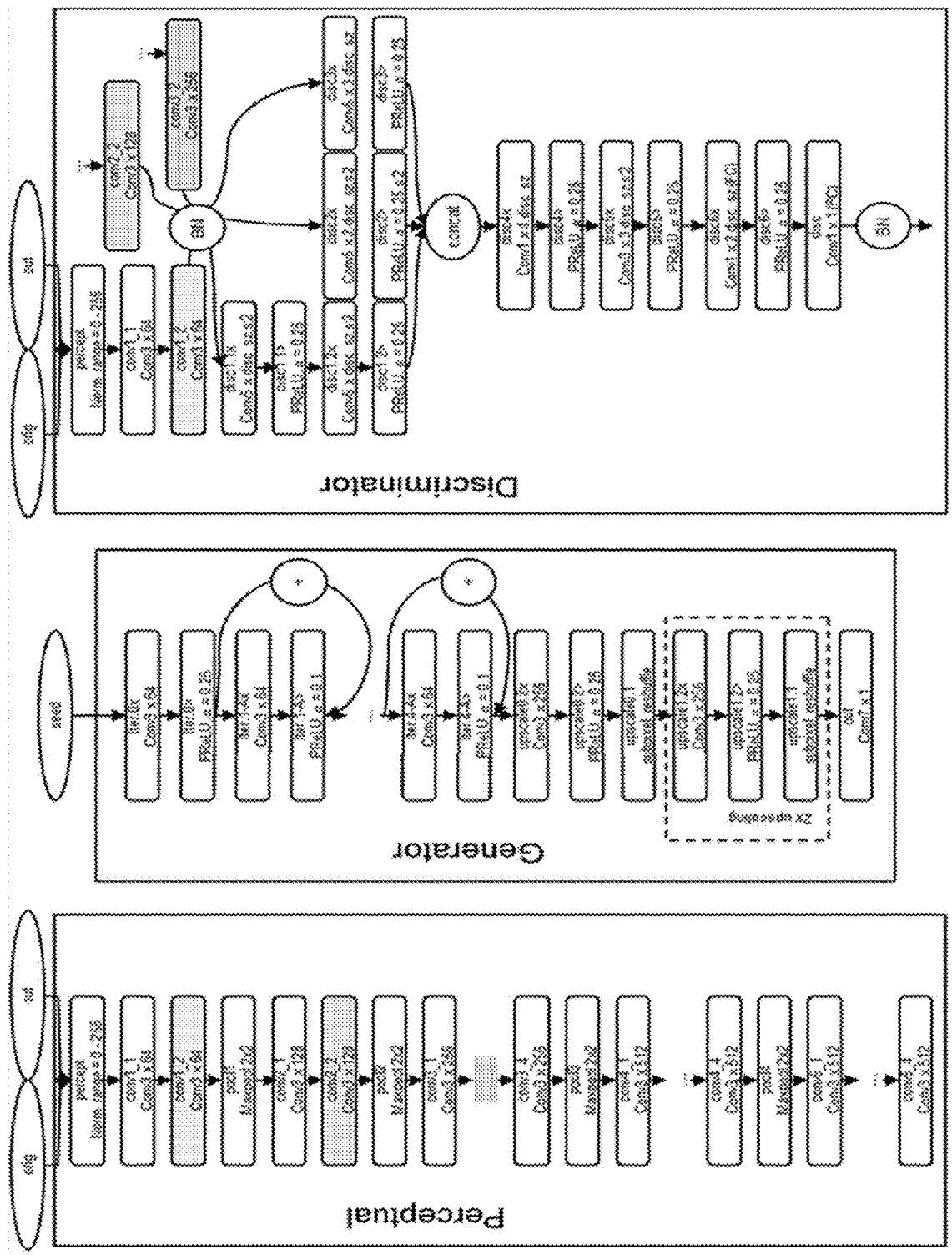
FIG. 3 shows a specific embodiment consisting of 3 CNN's.

FIG. 3 shows the detailed configuration of each of the network components.

The following abbreviations are used: Conv: convolutional layer, PReLU: Parameterized Rectifier Linear Unit, Maxpool: Maximum pooling, BN: Batch Normalization, concat: concatenation, s: stride, . . . .

Experiments were performed using various network configurations:

Auto-encoder (encoder-decoder) is a neural network used for unsupervised learning. It learns a (sparse) representation (encoding) for a set of data and has applications in noise reduction. A similar architecture is the U-Net.

Figure 4:
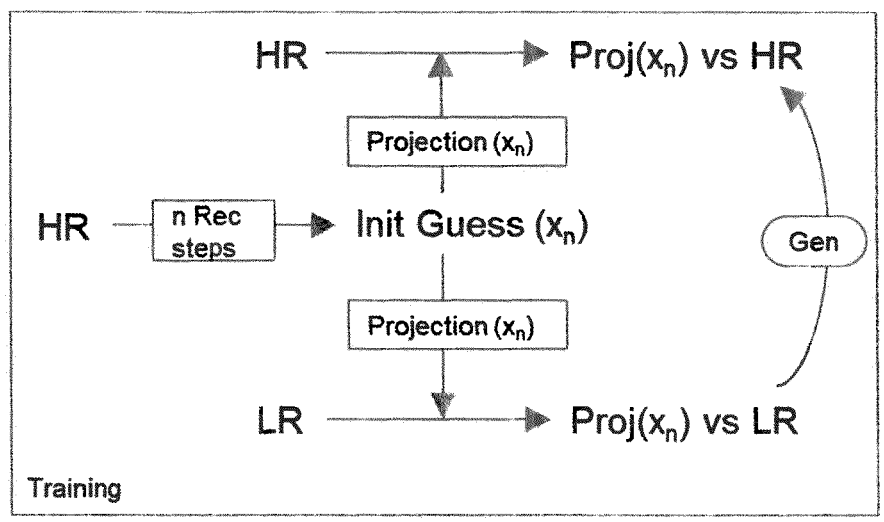
FIG. 4 schematically shows a specific embodiment of the training on tomographic images.

Generative adversarial network:

In a specific embodiment of the present invention as illustrated in FIG. 4, three CNNs are used that each have a designated role, namely: Generator (Gen), Discriminator (Disc) and Perceptual).

The Gen network plays the role of generating an output (out) that mimics the high quality image version of the low quality image input, while the Disc and Perceptual networks take the role of assessing the quality of the generated image and provide it as a feedback for the Gen network in order to improve the generated image quality.

The use of Gen and Disc network is based on the Generative Adversarial Network (GAN) [Goodfellow, Ian, Jean Pouget-Abadie, Mehdi Mirza, Bing Xu, David Warde-Farley, Sherjil Ozair, Aaron Courville and Yoshua Bengio. "Generative adversarial nets." In Advances in neural information processing systems, pp. 2672-2680, 2014.], that utilizes the concept of two networks competing to outperform each other, i.e. the Gen generating a convincingly high resolution (HR) realistic image and the Disc distinguishing between actual HR images and images generated by the Gen.

The Perceptual network is based on the work of [Johnson, Justin, Alexandre Alahi, and Li Fei-Fei. "Perceptual losses for real-time style transfer and super-resolution"arXiv preprint arXiv:1603.08155(2016)] which aimes to provide an assessment metric for the evaluation of the generated image quality that is more aligned to the human visual perception than just taking the differences in pixel brightness (e.g. MSE). The current network layout design is based on the work of [Alexjc on https://github.com/alexjc/neural-enhance] for super-resolution of photo images.

Training:

retraining: network weights are initialized to the weights from a trained network (E.g. on super resolution of photographic images).

No retraining: weights of network are initialized randomly

Input—output one low quality image input—one high quality image output

Multiple low quality image input containing current image of interest and corresponding previous and next images in the sequence, e.g. projection images from neighboring acquisition angles or neighboring image slices, and one high quality output. This approach takes advantage of the redundant information in different images.

Residual approach with a bypass connection from input to output demands the network to reconstruct only the difference between the low quality and the high quality image without having to learn to reconstruct the LQ image itself.

Scales:

Single scale input and output

Dual-scale input with a bypass connection for the low-passed input to output. The low-passed component (e.g. by Gaussian filtering) of the low quality and high quality image should be the same, thus this approach requires the network to learn to generate only the high frequency component of the HR.

Different performance metric: Perceptual, MSE, MAD

The network can be set using any combinations of the aforementioned configuration (e.g. a network that takes in three low quality image input and uses residual and dual-scale connection).

Since the training of the network uses image patches (i.e. small subregions of the entire image, which contain only a small part of the imaged object or body part), it is expected that the learned network can be applied generically to X-ray images of various body parts. The reason behind this hypothesis is that the content of the image patches from one X-ray image would have similar or the same nature as other X-ray images even when the acquired object is different. It aligns with the idea of transfer learning which is often applied to photo images using well-trained large network such as AlexNet or GoogleNet for varying task only by re-training the final layer. Since in this case, the task is the same (e.g. super resolution) and only the object in the image is different, the same network should be directly if not with little re-training applicable. To further improve the generality of the trained network, the training data can be diversified with image pairs of varying degradation. In that way, the trained network is expected to be able to increase image quality for different grades of degradation.

Figure 5:
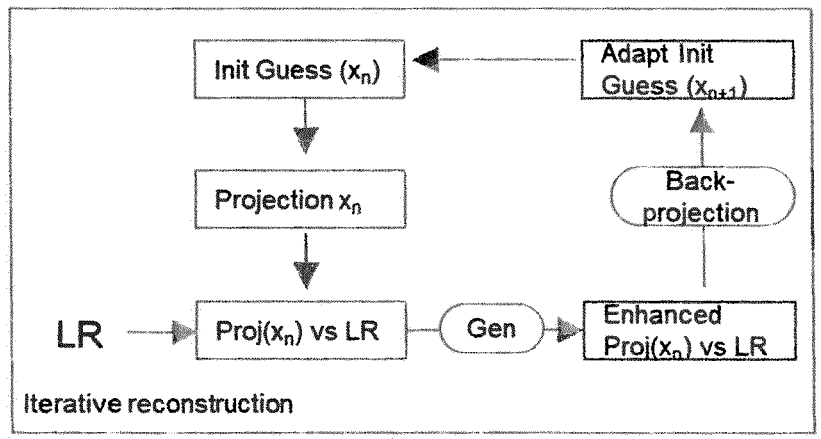
FIG. 5 schematically shows a specific embodiment of the proposed iterative reconstruction approach.

Iterative reconstruction correction (FIG. 4 and FIG. 5)

The general idea is to correct for deviations which arise from using degraded projection images in an iterative way.

The method is based on an iterative reconstruction algorithm running on a computer, such as a Simultaneous iterative reconstruction technique (SIRT) that is used to generate a 3D image representation of the object.

The iterative reconstruction algorithm starts from a so-called initial guess, which in one embodiment is a black image (all pixel values are zero). Alternatives may be envisaged.

After a given iterative reconstruction step, a trained neural network is used to enhance the image quality of a tomographic image.

Next, the enhanced tomographic image is used in the next iteration.

The iterative reconstruction illustrated in FIG. 5 starts from an initial guess at a current iteration step n. The result of this iteration step will be adapted as explained below.

A projection of initial guess $x_n$ is generated, initial guess $x_n$ being the result of applying the iterative reconstruction algorithm at a reconstruction step n.

This projection will be adapted as follows.

First a projection image LR is compared with the forward projection of the result of the previous iteration step Projection ($x_n$).

The result of this comparison is then enhanced by feeding it to a trained neural network GEN.

Next the enhanced result of the comparison (enhanced by applying the trained neural network) is back-projected and used to adapt the higher mentioned initial guess.

These steps are repeated in the course of the iterative reconstruction process.

Training of the neural network is illustrated in FIG. 4.

The neural network is trained with the result of a so-called low quality comparison as input and a so-called high quality comparison as output.

These low quality and high quality comparisons are generated as follows.

An initial guess $x_n$ at the n-th iteration step is generated by applying n reconstruction steps to a high quality (in this case high resolution) projection image.

From this initial guess $x_n$ image, projections are derived which are compared with a high quality (resolution) projection image as well as with a low quality (resolution) projection image so as to generate the above-mentioned high quality and low quality comparison, the low quality being used and input and the high quality as output during training of the neural network.

Low quality (LQ) images can be simulated by degrading existing HQ images (e.g. lower the resolution).

Another approach is to acquire LQ projection images by using a modified acquisition protocol (e.g. removing anti-scatter grid).

A third approach would be to simulate HQ and LQ acquisitions. An advantage of using such a model approach in the well-posed forward problem, forward projection in this case, is that adding more realistic physics (e.g. scatter) to the model is straightforward. The neural network will be trained to do the (ill-posed) inverse problem (e.g. reducing scatter) in the projection image and reduce artifacts in the final reconstructed tomographic image.

In a practical implementation, 1 iteration is performed for the reconstruction (e.g. SIRT) for LQ projection image. Next the trained network is applied to reduce the effects of degradation. Subsequently, the restored result is used as initial guess in the next iteration step (with LQ projection image).

Below some examples of training data and the achieved enhancements are described.

1. LQ projection images can be acquired by using available HQ projection images and down sample them (DS) to LQ projection images by using binning, low pass filtering, or others.

Another way is to acquire both HQ and LQ images from the same object by using a different detector pixel size. This can be done on a real object or with a computer model.

For different number of iteration steps (n), HQ tomographic images are obtained by iterative reconstruction on HQ projection data. For the next iteration step, LQ projection so data is used to obtain LQ tomographic image data, and HQ projection data is used to obtain HQ tomographic image data. After training neural network on HQ and LQ tomographic image data, the successive combination of iterative reconstruction steps and trained neural network on LO projection data will result in an increased resolution of the tomographic image compared to directly reconstructing the LO projection data.

2. HQ tomographic images obtained from HQ projection data can be used as training data set with more viewing directions than the LQ data set. This can be done by removing some viewing directions in HQ data, or by acquiring two datasets of the same object. As a result, LQ tomographic image will have limited view artifacts. Similar, in a limited angle acquisition, limited angle artifacts can be compensated for.

3. A network is trained by using normal dose data as HQ and low dose data as LQ.

One way of acquiring low dose data is by adding noise to the high quality projection images.

Another way is to acquire both HQ and LQ projection images from the same object by using different dose setting accordingly. This can be done on a real object or with a computer model.

The trained network is used to convert the tomographic low dose images to "virtual" normal dose tomographic images.

4. HQ and LQ projection images are acquired from the same object. HQ has reduced/no scattering. This can be achieved by using an anti-scatter grid.

Another way is to use a computer model approach and generate LO images by simulating scatter (e.g. Monte-Carlo simulations, scatter kernels) and HQ by not including scatter (e.g. ray tracing).

After training the neural network on HQ and LQ tomographic data obtained from the HQ and LQ projection data, the combination of the iterative reconstruction and the trained neural network will result in a reduction of scatter artefacts in the tomographic image.

5. HQ and LQ projection images are acquired from the same object. HQ is acquired with monochromatic X-rays and LQ is acquired with a different X-ray spectrum such as polychromatic X-rays. This can be achieved by using computer model in which the polychromatic transmission through materials are included and excluded. After training the neural network on HQ and LQ tomographic data obtained from HQ and LQ projection data, the combination of the iterative reconstruction and the trained neural network (s) will result in a reduction of beam hardening artifacts in the tomographic image.

6. HQ projection images are acquired from a certain (computer-modelled) object, LQ projection images are acquired from the same object but with some artifact inducing material (e.g. metal). After training the neural network on HQ and LQ tomographic data obtained from HQ and LQ projection data, the combination of the iterative reconstruction and the trained neural network will result in a reduction of artifacts introduced by the artifact inducing material.

7. One can infer the abovementioned trained networks sequentially. One can also train the network on a combination of the abovementioned degradations.

8. A similar approach could be applied for sinograms. In contrast, the x-axis in a sinogram represents the different viewing directions. In order to obtain more information neighboring sinograms could be taken into account.

In another embodiment, HQ and LQ tomographic images can be acquired by using different iterative reconstructing algorithms (advanced and standard) for a set of projection images.

As standard iterative reconstruction one can take a basis algebraic reconstruction (e.g. SART)

As advanced one, one can use a more advanced approach such as a model based iterative approach with regularization term. Some examples known in the art are: total variation minimization, scatter correction, beam hardening correction, motion compensation, misalignment correction, truncation, etc.

Another advanced reconstruction approach is likelihood-based iterative expectation-maximization algorithms. In this way, the reconstruction step is carried out fast and the trained neural network will simulate the advanced regularization term.

Moreover, some of the compensation needs cumbersome data dependent tuning. This tuning can also be trained by the network.

Another approach is to take less iterations or larger voxel size for the standard reconstruction compared to the advanced reconstruction and let the neural network compensate for this.

The invention claimed is:

1. A method of generating a tomographic image of an object comprising:
    acquiring a set of digital projection image data 'b' of the object, wherein the set of digital projection image data 'b' has a low image quality for at least one image quality aspect, and
    applying an iterative reconstruction algorithm to the set of digital projection image data 'b' to generate an enhanced tomographic image, wherein the iterative reconstruction algorithm includes a plurality of iteration steps starting from an initial guess, and wherein the applying comprises:
        comparing the digital projection image data 'b' to a forward-projection of a result of a previous iteration step to produce a comparison;
        subjecting the comparison to a neural network for enhancement thereof, wherein the neural network is trained in advance with a high quality comparison and a low quality comparison for the at least one image quality aspect; and
        applying a back-projection to the enhanced comparison to correct the result of the previous iteration step, and
    comparing a first set of projection images with a projection of the tomographic image to obtain the high quality comparison and comparing a second set of projection images with said projection of the tomographic image to obtain the low quality comparison,
    wherein the first set of projection images is of higher quality with respect to said image quality aspect than the second set of projection images, and
    wherein said first set of projection images comprises at least one projection image from a different image location in the object than the image location in the object of the projection images of the second set of projection images.

2. The method according to claim 1 wherein projection images of said second set are computed from projection images of said first set.

3. The method according to claim 1 further comprising applying an acquisition technique that results in a lower image quality for at least one image quality aspect to acquire projection images of said second set from the same object as the projection images of said first set.

4. The method according to claim 1 further comprising sub-sampling projection images of said first set to obtain projection images of said second set.

5. The method according to claim 1 further comprising at least one of adding noise to the projection images of said first set and modelling addition of noise to the projection images of said first set to obtain projection images of said second set.

6. The method according to claim 1 further comprising at least one of detecting a larger pixel size than is used to acquire projections images of said first set and modelling the use of larger size detector pixels to acquire projection images of said second set.

7. The method according to claim 1 further comprising at least one of irradiating at a lower dose than is used to obtain projections images of said first set and modelling lower dose irradiation to obtain projection images of said second set.

8. The method according to claim 1 further comprising at least one of irradiating with polychromatic rays and modelling polychromatic rays to obtain projection images of said second set, and wherein the projection images of said first set are obtained by using monochromatic rays.

9. The method according to claim 1 further comprising modelling scattering to obtain projection images of said second set.

10. The method according to claim 1 further comprising at least one of adding artifact-inducing materials to the object and modelling such an artifact to obtain projection images of said second set.

11. The method according to claim 1 wherein projection images of said second set are a subset of said first set.

12. The method according to claim 1 further comprising applying at least one standard iterative reconstructing step to acquire said low quality comparison and applying at least one advanced iterative reconstructing step to acquire said high quality comparison.

13. The method according to claim 12 wherein said advanced iterative reconstruction step refers to reconstruction at higher resolution than standard quality reconstruction.

14. The method according to claim 12 wherein said advanced iterative reconstruction step refers to an iterative reconstruction step with regularization or correction, or likelihood-based iterative expectation-maximization algorithms.

15. The method according to claim 12 wherein said advanced reconstruction step is an iterative reconstruction step with more iteration steps than said standard iterative reconstructing step.

16. The method according to claim 1 wherein said object is a human being, an animal, or a part thereof.

17. The method according to claim 1 wherein said object is a computer-modelled object.

* * * * *